Feb. 26, 1935.　　　G. E. GRINDROD　　　1,992,611
METHOD OF TREATING SULPHUR
Filed May 13, 1931　　　2 Sheets-Sheet 1

INVENTOR
George E. Grindrod
BY
Wheeler, Wheeler & Wheeler
ATTORNEYS

Patented Feb. 26, 1935

1,992,611

UNITED STATES PATENT OFFICE 1,992,611

METHOD OF TREATING SULPHUR

George E. Grindrod, Oconomowoc, Wis., assignor to Grindrod Process Corporation, Waukesha, Wis., a corporation of Wisconsin Application May 13, 1931, Serial No. 537,073

6 Claims. (Cl. 252—6)

My invention relates to a new method of treating sulphur, with particular reference to the production of colloidal sulphur, although applicable for the production of a non-crystalline sulphur product regardless of the size of the particles.

My objects are to provide a method of producing a new sulphur product which will be more active than crystalline sulphur in either the or-tho-rhombic or mono-clinic forms, and more active than the crystalline fragments heretofore known as colloidal sulphur; to provide a method for reducing sulphur to a more finely divided and truly colloidal form than has heretofore been thought to be commercially possible, and which method will disperse sulphur in globular form; to provide a method which will produce a sulphur product composed of globules of microscopic or colloidal size without crystal structure, such colloidal sulphur having capillary attraction and being capable of mixing readily with water.

Further objects are to provide a method of dispersing melted flowers of sulphur in a new form and solidifying the product in such a manner as to prevent crystallization.

A further object is to provide simple, inexpensive and expeditious means for producing a non-crystalline and unusually chemically active sulphur peculiarly suited to the requirements of the commercial arts, not only by reason of low cost of production but by reason of the increased chemical activity and more uniform colloidal characteristics.

My invention rests in part upon the discovery that a mixture of non-viscous, melted flowers of sulphur, water, and an emulsifying agent such, for example, as casein, may be subjected to the impactive and frictional effects of high velocity steam jets in such a manner as to produce an emulsion in which the sulphur will have been dispersed in the form of globules, the majority of which will be of microscopic size or even below the limit of microscopic visibility, and the casein will have been stabilized and adsorbed upon the globules.

This may be accomplished by injecting the steam into the mixture near the bottom thereof while maintaining the temperature between 115° C. and 145° C. and a pressure at the nozzle sufficient to develop jets of steam of high velocity and consequent impactive force to rapidly separate particles of sulphur from the mass at the nozzle outlets, split them up, and drive them with great force through the churning body of liquid and vapor, which, by agitation and frictional contacts, and the abrading effects of oppositely moving eddying material, aids in the reduction of the size of the particles and in the development of the globular form; also after converting the sulphur content of the mixture into these minute globules and adsorbing the protective colloid or emulsifying agent thereon, the mixture may be chilled by sub-division in a vacuum so instantly as to prevent crystallization. It is my object to provide a process which will utilize these discoveries and to produce a new sulphur product of unusual chemical activity and miscibility.

In the drawings:

Figure 2 is a similar view showing a modified form of apparatus by the use of which the method may be continuously carried on.

Figure 1:
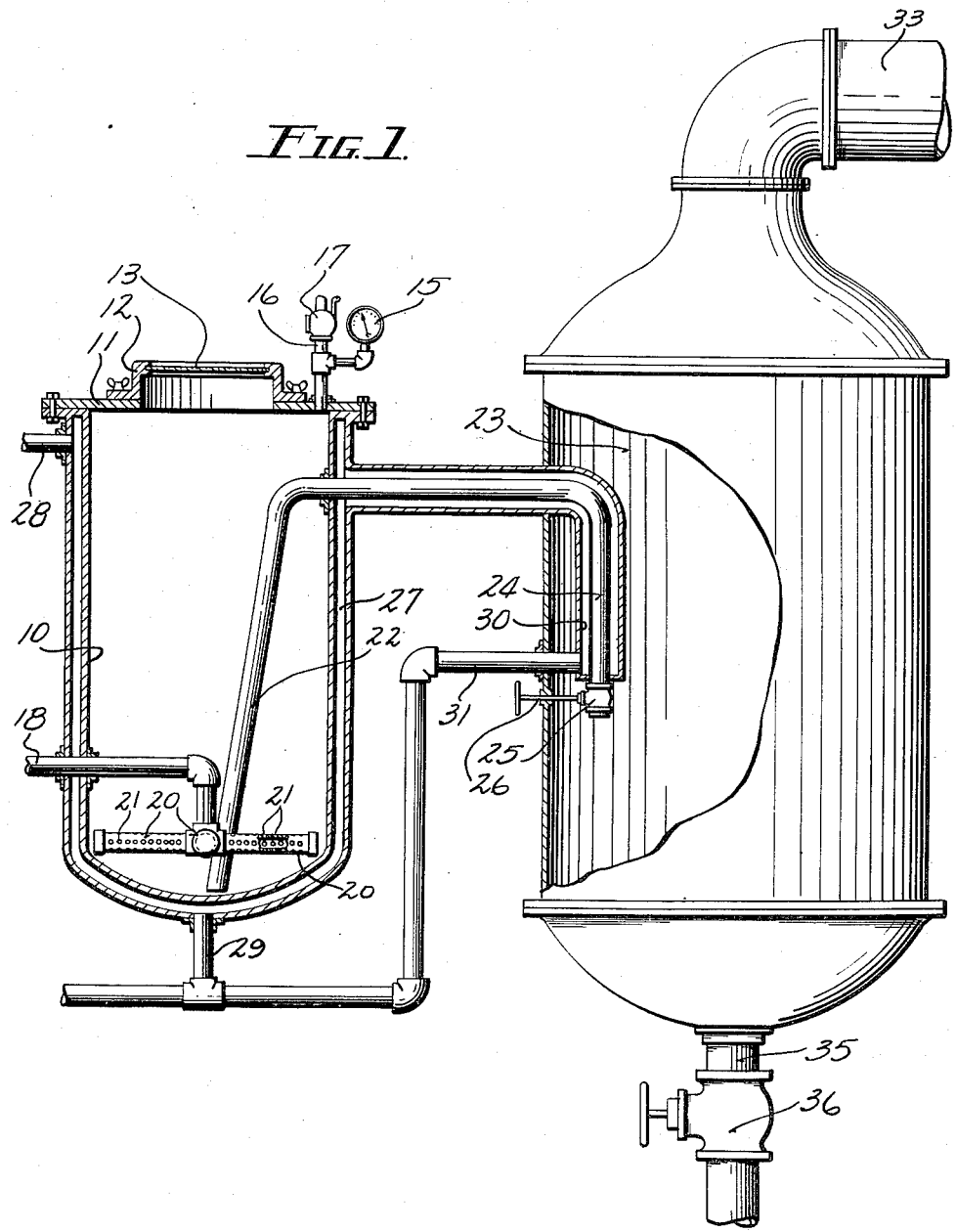
Figure 1 is a conventional illustration, partly in side elevation and partly in vertical section, of apparatus employed to facilitate carrying out the improved method.

In the practice of my improved method I prepare a mixture of flowers of sulphur, water, and an emulsifying agent such as soap, gum, casein (preferably skimmed milk). The proportionate weight of the solids contained in the skimmed milk will preferably range from five to ten per cent of the weight of the sulphur. For a less accurate preparation of the batch the skimmed milk and water may be mixed in the proportion of about three volumes of water to one of skimmed milk, and to this mixture a quantity of flowers of sulphur may be added equal in weight to about fifteen per cent of the weight of the mixture.

This mixture of water, skimmed milk and sulphur is formed or placed in a container which will be sufficiently heat insulated to facilitate the maintenance of a substantially constant temperature therein of about 120° C. I then inject steam, preferably in the form of a multitude of minute jets well distributed in the lower portion of the mixture, and the steam is so delivered at high velocity and under a temperature and pressure at the nozzle sufficient to quickly raise the temperature of the mixture to approximately 120° C. This steam injection should be continuously maintained for a period of from 1 to 3 minutes while allowing steam to escape from the container with sufficient freedom to prevent the development of a velocity checking back pressure upon the nozzles. By regulating the admission and the escape of steam under these conditions a temperature of approximately 120° C. may be maintained continuously throughout the period of steam injection, after an initial rise in temperature to that degree, and during this period the velocity of the steam jets will remain substantially uniform.

I preferably employ expanding nozzles which convert a considerable portion of the energy of the steam into kinetic energy in order to disperse the sulphur and to also disperse and stabilize the emulsifying agent, whereby the latter may be adsorbed upon the dispersed particles of sulphur. The agitation resulting from the injection of steam at such high velocities is far in excess of that which results from merely allowing bubbles of an elastic fluid to rise through a liquid, and I find that with any reasonable number and distribution of steam jets in proportion to the quantity of material being treated, I am enabled to subject substantially all particles of the material to the impactive and eroding effects of the rapidly moving steam particles within a few minutes. During this time a considerable percentage of the sulphur will have been reduced to particles of colloidal size, and these particles, by colloidal adsorption, gather some of the casein from the casein in solution and become stabilized against reamalgamation.

Owing to the rapid movement of the particles in the liquid and the vapor they assume a globular form, and a considerable percentage of these globules will be of microscopic size or of a size beyond microscopic visibility. Some of the globules remain of larger size, although during the preferred time of steam injection as above set forth, the sulphur will be dispersed into an average globule size of approximately five to ten microns, although a considerable portion will be either finer or coarser. All of the globules will become encased in the protective colloid.

For any given particle, dispersion is instantaneous, but in the adsorption of the casein, time is a factor. In the treatment of batches as illustrated in Figure 1, the time required to disperse the particles generally will require from one to three minutes, the time varying with the quantity of material. Thereupon, the steam supply is shut off and the material sprayed into an atmosphere sufficiently lower in pressure to allow the temperature of the material to be so instantly reduced as to solidify the sulphur particles without allowing time for crystallization. In commercial practice it will be found desirable to spray the material into a partial vacuum. The conditions should be such that the material can be maintained in the molten condition as a stabilized emulsion of liquid sulphur, at a temperature of about 120° C. up to the instant of delivery as a spray into a vacuum chamber, whereby the change of temperature may be instantaneous for each individual particle.

I find that sulphur loses a considerable portion of its chemical activity when it crystallizes. It is characterized by a great affinity for combining with itself into crystals, a truly amorphous or colloidal sulphur not being producible either by precipitation from chemical solution or from vapor. I find that the transformation of sulphur from the liquid to the crystalline state requires a definite but extremely short period of time necessary for the molecules to migrate into positions to form crystals. By cooling the globular particles within a time interval so short that the molecules have no opportunity to rearrange themselves in the form of crystals, a truly amorphous sulphur is obtained.

In stating that my improved sulphur product is non-crystalline, I do not wish to imply that some slight internal crystalline formation may not be present, at least in the larger globules. But for practical purposes the product is non-crystalline.

I employ apparatus, including the container within which the steam treatment is carried on and its accessories, composed of or coated with material which is chemically resistant to the action of sulphur. Chrome nickel alloys are preferred, such material being durable and capable of withstanding high temperatures while remaining chemically resistant or inert to the action of sulphur. Glass may be used, particularly as to parts least subject to breakage. The parts should also be heat insulated to such an extent that the proper temperature can be maintained in every portion of the mixture until the operation is completed and the material delivered into the vacuum chamber or other place available for such instant refrigeration as to prevent the formation of crystals.

Attempts have heretofore been made to disperse molten sulphur by employing a steam jet to deliver it through an atomizer in the presence of protein or an equivalent emulsifying agent. But so far as I am aware, no successful commercial process of that kind has ever been heretofore developed because of the failure to realize the necessity of maintaining the temperature during the steam treatment and for a sufficient period of time to complete the adsorption of the proteins upon the sub-divided sulphur particles, and also because no adequate means was provided for maintaining the temperature of the material to the instant of final delivery, followed by a chilling thereof within less time than that required for the formation of crystals. Also, so far as I am aware, no attempt was made to provide materials capable of resisting the action of the sulphur at the temperature required for the proper treatment thereof. I believe I am the first to provide means for producing a non-crystalline sulphur product of greater chemical activity than crystalline sulphur and capable of being readily mixed with water after having been dried.

The material accumulating in the vacuum chamber is in liquid form. It may be condensed to any degree desired for commercial use, in which condition it will ordinarily have a water content of about 50%. But it may also be evaporated to dryness to produce an extremely fine sulphur powder, the particles of which range in size from below the limits of visibility to above colloidal size, and which, under the microscope, are found to be globular in form and without crystalline structure.

In the drawings I have illustrated two types of apparatus which may be employed to facilitate the practice of my method for the treatment of sulphur. In both of these forms steam will preferably be employed as the dispersing agent. In Figure 1 a mixture of sulphur, water, and the emulsifying agent is placed in a container 10 having a top wall 11 preferably provided with a removable portion 12, which may have a pyrex glass window 13 through which the action of the steam upon the material may be observed. The top wall 11 may be provided with a pressure gauge 15 and an associated vent pipe 16 provided with a manually operable valve 17, whereby the pressure within the container may be regulated. Steam is admitted to the container 10 through a pipe 18, dry steam at a pressure of from 50 to 100 pounds per square inch being preferably employed. The steam is discharged into the contents of the container through the radially extending branch pipes 20 and a series of nozzles 21, preferably conically enlarged or expander nozzles being employed, and the combined capacity of the nozzles being less than that of the pipe 18 and its branches, whereby substantially the full pressure of the steam may be maintained at the nozzle inlets. The branch pipes 20 should be as close to the bottom of the container as is conveniently possible.

An outlet pipe 22 extends from a point substantially at the bottom of the container 10 upwardly to near the top thereof and thence laterally through the wall of the container into a vacuum chamber 23. Within the vacuum chamber the pipe 22 has a down-turned extension 24 provided with a valve at 25 having a stem 26 extending through the wall of the chamber and provided with an exterior operating handle.

The container 10 and all portions of the pipe 22 exterior thereto, including the downturned extremity 24 within the vacuum chamber, are provided with a spaced jacket 27, the jacket cavity being supplied with a heating fluid (steam or water) which is admitted from a suitable source of supply through a pipe 28 and discharged from the bottom of the jacket cavity of the container through a pipe 29 and from the lower end of the pipe jacket 30 through the pipe 31, the latter being preferably connected with the pipe 29 as shown, whereby the circulating fluid may be returned to the source of supply or delivered to a suitable point of discharge. The fluid in the jacket cavity will be maintained at a temperature of at least 120° C., and preferably slightly above that temperature, although there will be little difficulty in maintaining the temperature within the container at 120° C. while injecting steam into the container through the pipe 18, the temperature of the steam so injected being sufficiently above 120° C. to compensate for heat losses due to expansion or radiation through the top wall and cap, and by convection through the vent.

The process may be carried on at temperatures ranging between 115° C. and 145° C., i. e., at any temperature range in which the melted sulphur is in its less viscous liquid allotropic phase, i. e., it is at a temperature at which it maintains its characteristic as a thin non-viscous liquid, but the best results appear to be obtained at the above stated temperature of 120° C. The container and all accessories should be made of an alloy of chrome nickel except that the sight glasses and other portions, when desired, may be formed of pyrex glass, i. e., glass properly annealed and tempered.

With the construction shown, and with numerous nozzle outlets well distributed in close proximity to each other over the bottom of the container, substantially all particles of the material may be subjected to direct contact with particles of steam moving at high velocity within a time interval of from one to three minutes, whereupon the valve at 25 may be opened and the contents of the container discharged into the vacuum chamber 23, from which air and vapor will be constantly exhausted through the pipe 33. The valve 25 being located at the extreme outlet end of the extension 24 of the discharge pipe 22, and said discharge pipe being jacketed, it is obvious that the temperature of the sulphur mixture may be maintained to the point of discharge into the vacuum chamber and that the particles will thereupon be instantly reduced in temperature with the resulting substantially instantaneous solidification of the sulphur globules. This solidification will be accomplished so quickly that crystalline structure will be absent from these globules. Sufficient water will be employed in the mixture so that after chilling in the vacuum chamber the mixture will have a milky appearance, with almost the fluidity of milk, and it may thereafter be drawn off through the outlet pipe 35 by opening the valve at 36, after which the water may be vaporized to produce a dry sulphur product. If desired, this product may be passed through a screen or centrifuge to separate the larger sulphur globules for subsequent treatment or for use where particles of colloidal size are not required.

Figure 2:
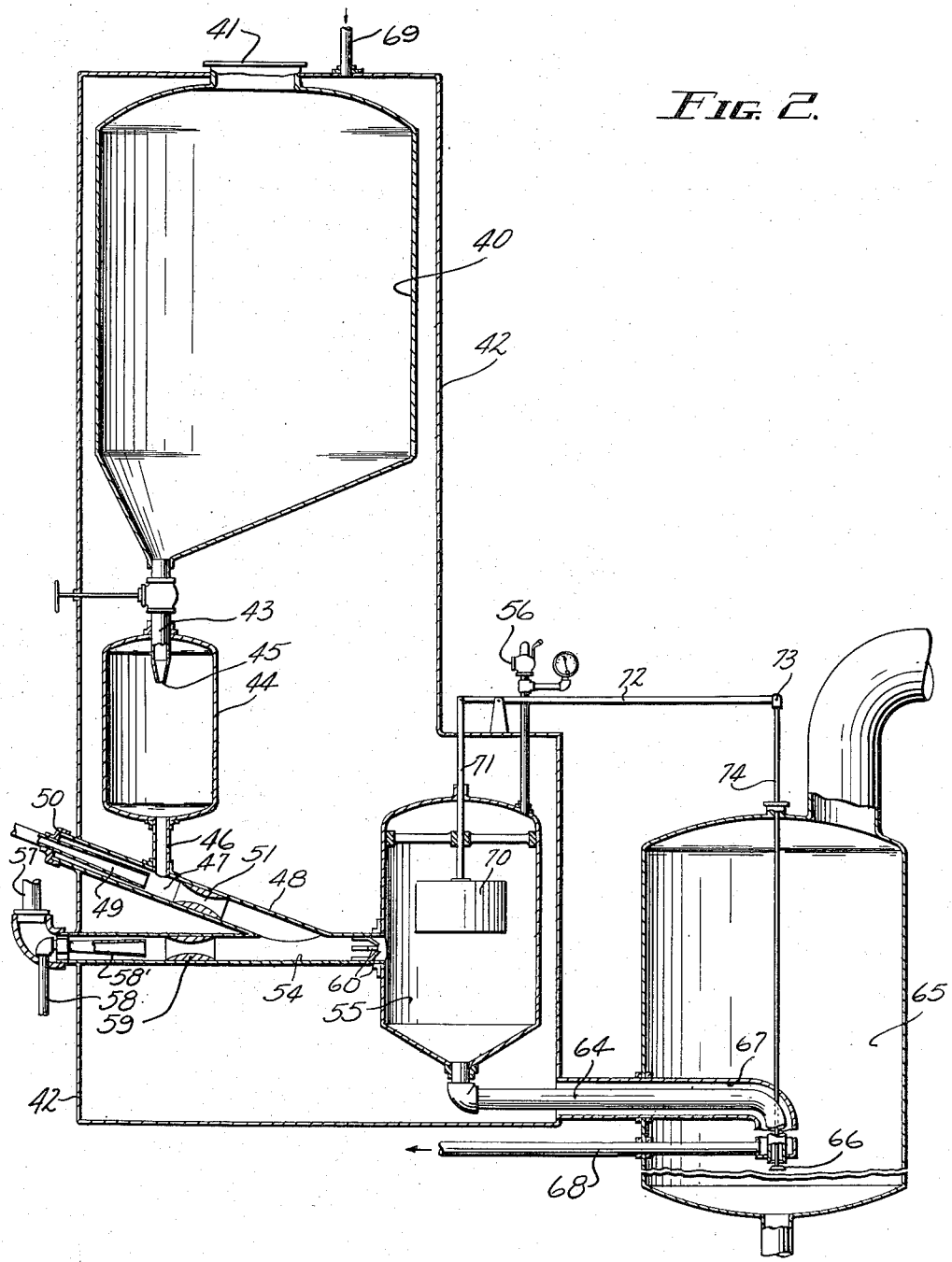

In Figure 2, I have illustrated apparatus to facilitate the continuous practice of the above described method.

Quantities of mixed sulphur, preferably flowers of sulphur, may be fed from time to time into a melting chamber 40 provided with a normally capped manhole at 41. This melting chamber 40 may be located within a jacket 42 which forms a heating chamber, within which the operation of mixing the sulphur with water and an emulsifying agent and of simultaneously steam treating it, may be continuously carried out.

To accomplish this result the melted sulphur is allowed to flow from the melting chamber 40 through a pipe 43 into a smaller container 44, through the top of which pipe 43 extends. The pipe 43 preferably has a drip nozzle 45 within the container 44, and at the bottom of this container a conduit 46 allows the melted sulphur to flow into the cavity 47 of an atomizer tube 48 of the ejector type, this tube having an axially disposed expander nozzle 49 extending through its capped end 50 with its conically enlarged outlet end adapted to deliver steam directly into the cavity 47 to blow the melted sulphur through a Venturi tube 51 to the delivery end of the tube 48 which communicates with a similar tube 54 extending horizontally into a receiving chamber 55. The latter has a valve controlled vent at 56 whereby both temperature and pressure may be controlled and steam allowed to flow through the mixture in chamber 55, thus keeping the upper portion thereof in continuous agitation.

The tube 54 extends through the wall of the jacket 42 and is elbowed outside of said jacket to receive a mixture of water and an emulsifying agent through the pipe 57. A steam supply pipe 58 enters through the elbow and is provided with an expander nozzle 58', whereby the mixture of water and the emulsifying agent may be atomized and blown through the Venturi tube 59 into the path of the atomized sulphur entering pipe 54 from pipe 48. The pipe 48 connects with the pipe 54 at an acute angle facing the outlet pipe 54, and a thorough mixture of the atomized water, emulsifying agent and sulphur may therefore be easily accomplished, although preferably the mixture is blown against mixing baffles 60 at the outlet end of the pipe 54 to ensure a complete homogenization of the mixture.

While the process is being carried on, a supply of the mixed and melted fluid will preferably be maintained within the chamber 55 above the level of the pipe 54. The liquid may be drained from the receiving chamber 55 through a pipe 64 into a vacuum chamber 65, the pipe 64 having a down-turned end portion provided with a check valve 66 at its outlet. This pipe 64 will be provided with a jacket 67 extending to its outlet end as heretofore described with reference to the pipe 24 in Figure 1, return flow from the jacket cavity being permitted through the pipe 68, and the heating fluid being admitted to the jacket cavity through the pipe 69 connected at or near the top of the jacket.

Discharge from the chamber 55 may be regulated by a float 70 therein, this float having an upwardly projecting stem 71 pivotally connected with a lever 72, the long arm of which is also pivotally connected at 73 with a stem 74 to which the check valve 66 is attached. With this construction, downward movement of the float 70 will cause the check valve 66 to be lifted to closing position, and upward movement of the float 70, as the liquid accumulates in the receiving container 55, will be transmitted through the lever 72 to open the valve 66, thus maintaining a substantially constant level of the liquid in the chamber 55.

Dispersion of the sulphur will be accomplished in the vicinity of the expander nozzle 49, but may be rendered more complete by the impact of the atoms of steam, water, and the emulsifying agent at the junction of the pipe 48 with the pipe 54.

The mixture of these dispersed particles of sulphur with the emulsifying agent, and the adsorption of the latter upon the globular sulphur particles will be accomplished in part within that portion of the pipe 54 into which the atomized components are being blown and mixed, and will be completed within the container 55 while the material is being maintained at approximately 120° C. by the heating fluid in the jacket cavity. This heating fluid follows the outlet pipe 67 and maintains the temperature to the extreme end of the pipe, where even the valve 66 will be kept hot by the outflowing stream of sulphur. The valve operates as a spreader, and therefore the material will be instantly chilled while being sprayed by the steam pressure over a wide area within the vacuum chamber.

I claim:

1. A process of treating sulphur consisting in heating a mixture of sulphur, water, and a protective colloid to produce a mixture which includes melted sulphur of low viscosity, subjecting the particles of the mixture uniformly to the dispersing effects of steam jets injected therein at a velocity sufficient to break up a considerable portion of the sulphur into particles of colloidal size in globular form, maintaining such steam injection until substantially all the particles of sulphur have been subjected to direct contact with one or more jets of steam and the dispersed sulphur particles coated with said colloid, and then discharging the material into vacuum in distributed form to instantly solidify such particles and to cool them to atmospheric temperature without allowing time for material crystallization.

2. A process of treating sulphur consisting in continuously delivering molten sulphur of low viscosity into the path of an elastic fluid moving at a dispersing velocity under regulated temperature above the melting point of the sulphur to disperse the sulphur, mixing the dispersed material with a protective colloid and causing said protective colloid to be adsorbed upon the dispersed material; delivering said material, while maintaining the dispersed sulphur in a molten condition to the point of delivery, into a partial vacuum to vaporize a portion of said mixture to cool the mixture to solidify said sulphur particles in their dispersed form.

3. A process of treating sulphur consisting in heating a mixture of sulphur, water, and protective colloid to a temperature at which the sulphur is in its less viscous liquid allotropic phase, subjecting the mixture to mechanical energy to emulsify the liquid sulphur in the water and to cause adsorption of the protective colloid on the dispersed sulphur particles, rapidly cooling the emulsified mixture to a temperature below that at which the sulphur changes from an amorphous solid state to a crystalline state and at a rate sufficiently rapid to substantially forestall any crystallization thereof.

4. The process of treating sulphur consisting in heating a mixture of sulphur, water, and a protective colloid to a temperature at which the sulphur is in its less viscous liquid allotropic phase, subjecting the heated mixture to the action of high velocity steam jets to disperse the sulphur in the water in the form of minute particles, and to cause the adsorption of the protective colloid on said sulphur, without changing the temperature of the mixture to cause a change in the condition of the sulphur; and lowering the temperature of said mixture to a point below that in which amorphous sulphur is substantially resistant to crystallization and at a rate sufficiently rapid to solidify the sulphur within less time than that required for crystallization.

5. The process of treating sulphur consisting in heating a mixture of sulphur, water, and a protective colloid to a temperature at which the sulphur is in its less viscous allotropic phase, subjecting the heated mixture to the action of high velocity steam jets to disperse the sulphur in the water in the form of minute particles, and to cause the adsorption of the protective colloid on said sulphur, without changing the temperature of the mixture to cause a change in the condition of the sulphur; and discharging the heated steam treated mixture into a partial vacuum to cool the material sufficiently rapidly to solidify the sulphur in an amorphous form, and to a point where the sulphur is substantially resistant to crystallization.

6. A process of manufacturing a finely dispersed sulphur product consisting in heating a mixture of sulphur, water and a protective colloid to a temperature at which the sulphur is in its less viscous liquid allotropic phase, applying mechanical energy to disperse and emulsify the sulphur in the water and to cause adsorption of the protective colloid upon the dispersed sulphur particles while maintaining the mixture at said temperature, and then delivering it in this distributed form and at the said temperature into a medium of such relatively low pressure and temperature as to allow solidification of the dispersed sulphur particles to take place while dropping by gravity through said medium.

GEORGE E. GRINDROD.